United States Patent
Buys et al.

(10) Patent No.: US 10,887,971 B1
(45) Date of Patent: Jan. 5, 2021

(54) LIGHTING GRAPH-BASED CONDITIONAL CONTROL OF A LIGHTING SYSTEM

(71) Applicant: Electronic Theatre Controls, Inc., Middleton, WI (US)

(72) Inventors: Koen Buys, Hofstade (BE); Daan Gerits, Aarschot (BE); Sarah Catherine Clausen, Geretsried (DE)

(73) Assignee: Electronic Theatre Controls, Inc., Middleton, WI (US)

( * ) Notice: Subject to any disclaimer, the term of this patent is extended or adjusted under 35 U.S.C. 154(b) by 0 days.

(21) Appl. No.: 16/683,747

(22) Filed: Nov. 14, 2019

(51) Int. Cl.
*H05B 47/11* (2020.01)
*H05B 47/155* (2020.01)
*H05B 47/175* (2020.01)

(52) U.S. Cl.
CPC ........... *H05B 47/11* (2020.01); *H05B 47/155* (2020.01); *H05B 47/175* (2020.01)

(58) Field of Classification Search
None
See application file for complete search history.

(56) References Cited

U.S. PATENT DOCUMENTS

| | | | |
|---|---|---|---|
| 5,307,295 | A | 4/1994 | Taylor et al. |
| 7,532,212 | B2 | 5/2009 | Grassia et al. |
| 7,532,217 | B2 | 5/2009 | Marrin et al. |
| 2011/0018448 | A1 * | 1/2011 | Metchear, III ......... F21S 9/035 315/152 |

OTHER PUBLICATIONS

Brock Engineering, Fred Klingener, "Inverse Kinematics on the Java 3D Scene Graph", website: Klingener@BrockEng.com, (6 Pages).
Marco Kogler, "Simulation and Visualization of Agents in 3D Environments", Diploma Thesis dated Feb. 26, 2003 (97 Pages).
Jonathan Pickup, "Introduction to Marionette in Vectorworks" You Tube Video: https://www.youtube.com/watch?v=8G-IBA7LCJE, 2016, PDF re-cap 9 Pages.

* cited by examiner

*Primary Examiner* — Dedei K Hammond
(74) *Attorney, Agent, or Firm* — Michael Best and Friedrich LLP

(57) ABSTRACT

Systems and methods for controlling transitions in a lighting system based on a lighting graph. The system includes a light fixture, a controller, and a memory. The controller stores three or more lighting states and associates each with a respective lighting parameter for controlling the light fixture. Multiple input state transition paths and multiple output state transition paths are associated with each lighting state. The controller receives an input signal and determines an output state transition path that indicates a second lighting state of the three or more lighting states. The determination of the transition path is based on a condition or is unconditional. A light control signal is transmitted to the light fixture based on the respective lighting parameter associated with the second lighting state. A lighting state includes all of the parameters to execute the state, or parameters that define a difference from a prior lighting state.

26 Claims, 9 Drawing Sheets

LIGHTING GRAPH-BASED CONDITIONAL CONTROL OF A LIGHTING SYSTEM

TECHNICAL FIELD

Embodiments described herein relate to controlling one or more light fixtures. More specifically, the embodiments relate to a lighting system that controls drive signals to one or more light fixtures based on lighting states where a lighting state can transition to any of multiple lighting states subject to a condition or transition from any of multiple states subject to a condition.

BACKGROUND

Traditional methods for controlling lighting effects in theater productions, concerts, and other types of events rely on cue lists. A cue list provides a sequential list of lighting states that are applied to light fixtures over time to drive a progression of desired effects. For example, a sequence of lighting cues may be implemented with software executed by a lighting system controller, or a cue sequence may proceed when a user input is received via a graphical user interface ("GUI") or control board.

SUMMARY

Embodiments described herein provide a system for controlling transitions in a lighting system based on a lighting graph. The system includes a light fixture and a controller. The controller is electrically connected to the light fixture. The controller includes an electronic processor and a memory electrically connected to the electronic processor. The memory stores instructions that when executed by the electronic processor configure the controller to store, in the memory, three or more lighting states. Each of the three or more lighting states is associated with a respective lighting parameter for controlling the light fixture. The controller is further configured to associate, in memory, multiple input state transition paths with each of the three or more lighting states. The multiple input state transition paths identify candidate prior states relative to the three or more lighting states. The controller is further configured to associate, in memory, multiple output state transition paths with each of the three or more lighting states. The multiple output state transition paths identify candidate next states relative to the three or more lighting states. The controller is further configured to determine a first output state transition path of the multiple output state transition paths associated with a first lighting state of the three or more lighting states. The first output state transition path indicates a second lighting state of the three or more lighting states. The controller is further configured to transmit a light control signal to the light fixture based on the respective lighting parameter associated with the second lighting state of the three or more lighting states.

In some embodiments, the respective lighting parameters for controlling the light fixture of the three or more lighting states define an entire lighting state or define a difference relative to a prior-played lighting state.

In some embodiments, the system also includes one or more additional light fixtures electrically connected to the controller. Each of the three or more lighting states is associated with a respective one or more lighting parameters for controlling the one or more additional light fixtures. The controller is further configured to transmit a light control signal to the one or more additional light fixtures based on the respective one or more lighting parameters associated with the second lighting state of the three or more lighting states.

In some embodiments, the controller is further configured to receive an input signal related to a condition internal or external to the lighting system, and evaluate the condition and generate a first condition evaluation result. The first output state transition path of the multiple output state transition paths associated with a first lighting state of the three or more lighting states, is determined based on the first condition evaluation result.

In some embodiments, the system also includes a sensor. The controller detects an output from the sensor and the condition is based on the output from the sensor.

In some embodiments, the condition is based on information known by the system, information stored in the memory, or a user input received by the controller via a user interface of the system.

In some embodiments, the input signal is generated based on a program executed by the electronic processor in response to a user input received by the controller via a user interface of the system, or a condition detected by the controller.

In some embodiments, in response to a second evaluation result, the controller is further configured to select a default output state transition path that identifies a third lighting state of the three or more lighting states and transmit a light control signal to the light fixture based on the respective lighting parameter associated with the third lighting state of the three or more lighting states.

In some embodiments, the system further includes a display device. The controller is further configured to generate an interactive user interface including user selectable elements that enable a user to select the output state transition path for the first lighting state of the three or more lighting states. The user selectable elements for the user selection of the output state transition path are rendered active or in-active in the user interface based on a condition detected by the controller. The controller is further configured to detect a user selection of the output state transition path for the first lighting state of the three or more lighting states where the user selection is received via an active selectable element of the graphical user interface and generate the input signal related to the condition internal or external to the lighting system based on the user selection.

In some embodiments, the condition internal to the lighting system includes a level of a fader, a light fixture intensity, a light fixture color output, configurations of light fixture locations, fog machine control, or a number of light fixtures available for control. The conditions external to the lighting system include wind speed or wind direction, ambient light level, or a sound level, pitch, or cadence, wherein the conditions external to the lighting system are detected via a sensor connected to the controller.

Embodiments described herein provide a method for controlling transitions in a lighting system based on a lighting graph. The method includes storing in a memory, by an electronic processor, three or more lighting states. Each of the three or more lighting states is associated with a respective lighting parameter for controlling a light fixture of the lighting system. Multiple input state transition paths are associated in memory with each of the three or more lighting states, where the multiple input state transition paths identify candidate prior states relative to the three or more lighting states. Multiple output state transition paths are associated in memory with each of the three or more lighting states. Each of the multiple output state transition paths identify candidate next states relative to the three or more lighting states. The electronic processor is configured to determine a first output state transition path of the multiple output state transition paths associated with a first lighting state of the three or more lighting states. The first output state transition path indicates a second lighting state of the three or more lighting states. A light control signal is transmitted to the light fixture based on the respective lighting parameter associated with the second lighting state of the three or more lighting states.

In some embodiments, the respective lighting parameters for controlling the light fixture of the three or more lighting states define an entire lighting state or define a difference relative to a prior-played lighting state.

In some embodiments, each of the three or more lighting states is associated in the memory with a respective one or more lighting parameters for controlling one or more additional light fixtures. A light control signal is transmitted to the one or more additional light fixtures based on the respective one or more lighting parameters associated with the second lighting state of the three or more lighting states.

In some embodiments, the method further includes receiving an input signal related to a condition internal or external to the lighting system, and evaluating the condition and generate a first condition evaluation result. The first output state transition path of the multiple output state transition paths associated with a first lighting state of the three or more lighting states, is determined based on the first condition evaluation result.

In some embodiments, an output from a sensor is detected and the condition is based on the output from the sensor.

In some embodiments, the condition is based on information known by the lighting system, information stored in the memory, or a user input received by the electronic processor via a user interface of the lighting system.

In some embodiments, the input signal is generated based on a program executed by the electronic processor, in response to a user input received by the electronic processor via a user interface of the lighting system, or a condition detected by the electronic processor.

In some embodiments, in response to a second evaluation result a default output state transition path that identifies a third lighting state of the three or more lighting states is selected. A light control signal is transmitted to the light fixture based on the respective lighting parameter associated with the third lighting state of the three or more lighting states.

In some embodiments, the method further includes generating, for display on a display device, an interactive user interface including user selectable elements that enable a user to select the output state transition path for the first lighting state of the three or more lighting states. The user selectable elements of the interactive user interface for the user selection of the output state transition path are rendered active or in-active in the user interface based on a condition detected by the electronic processor. The method further includes detecting a user selection of the output state transition path for the first lighting state of the three or more lighting states. The user selection is received via an active selectable element of the graphical user interface. The method further includes generating the input signal related to the condition internal or external to the lighting system based on the user selection.

In some embodiments, the condition internal to the lighting system includes a level of a fader, a light fixture intensity, a light fixture color output, configurations of light fixture locations, fog machine control, or a number of light fixtures available for control. The conditions external to the lighting system include wind speed or wind direction, ambient light level, or a sound level, pitch, or cadence, wherein the conditions external to the lighting system are detected via a sensor connected to the controller.

Embodiments described herein provide a computer readable medium storing a program for controlling transitions in a lighting system based on a lighting graph. The program is executable by an electronic processor, where the program configures a controller to store, in a memory, three or more lighting states. Each of the three or more lighting states is associated with a respective lighting parameter for controlling a light fixture of the lighting system. Multiple input state transition paths are associated in the memory with each of the three or more lighting states. The multiple input state transition paths identify candidate prior states relative to the three or more lighting states. Multiple output state transition paths are associated in the memory with each of the three or more lighting states. The multiple output state transition paths identify candidate next states relative to the three or more lighting states. The program further configures the controller to determine a first output state transition path of the multiple output state transition paths associated with a first lighting state of the three or more lighting states. The first output state transition path indicates a second lighting state of the three or more lighting states. A light control signal is transmitted to the light fixture based on the respective lighting parameter associated with the second lighting state of the three or more lighting states.

In some embodiments, the respective lighting parameters for controlling the light fixture of the three or more lighting states define an entire lighting state or define a difference relative to a prior-played lighting state.

In some embodiments, the program further configures the controller to receive an input signal related to a condition internal or external to the lighting system, and evaluate the condition and generate a first condition evaluation result. The first output state transition path of the multiple output state transition paths associated with a first lighting state of the three or more lighting states, is determined based on the first condition evaluation result.

In some embodiments, the input signal is generated based on a program executed by the electronic processor, in response to a user input received by the controller via a user interface of the lighting system, or a condition detected by the controller.

In some embodiments, the program further configures the controller to generate, for display on a display device, an interactive user interface including user selectable elements that enable a user to select the output state transition path for the first lighting state of the three or more lighting states. The user selectable elements of the interactive user interface for the user selection of the output state transition path are rendered active or in-active in the user interface based on a condition detected by the electronic processor. The program further configures the controller to detect a user selection of the output state transition path for the first lighting state of the three or more lighting states, where the user selection is received via an active selectable element of the graphical user interface. The input signal related to the condition internal or external to the lighting system is generated based on the user selection.

In some embodiments, the condition internal to the lighting system includes a level of a fader, a light fixture intensity, a light fixture color output, configurations of light fixture locations, fog machine control, or a number of light fixtures available for control. The conditions external to the lighting system include wind speed or wind direction, ambient light level, or a sound level, pitch, or cadence, wherein the conditions external to the lighting system are detected via a sensor connected to the controller.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other aspects of the embodiments will become apparent by consideration of the detailed description and accompanying drawings.

DETAILED DESCRIPTION

Figure 1:
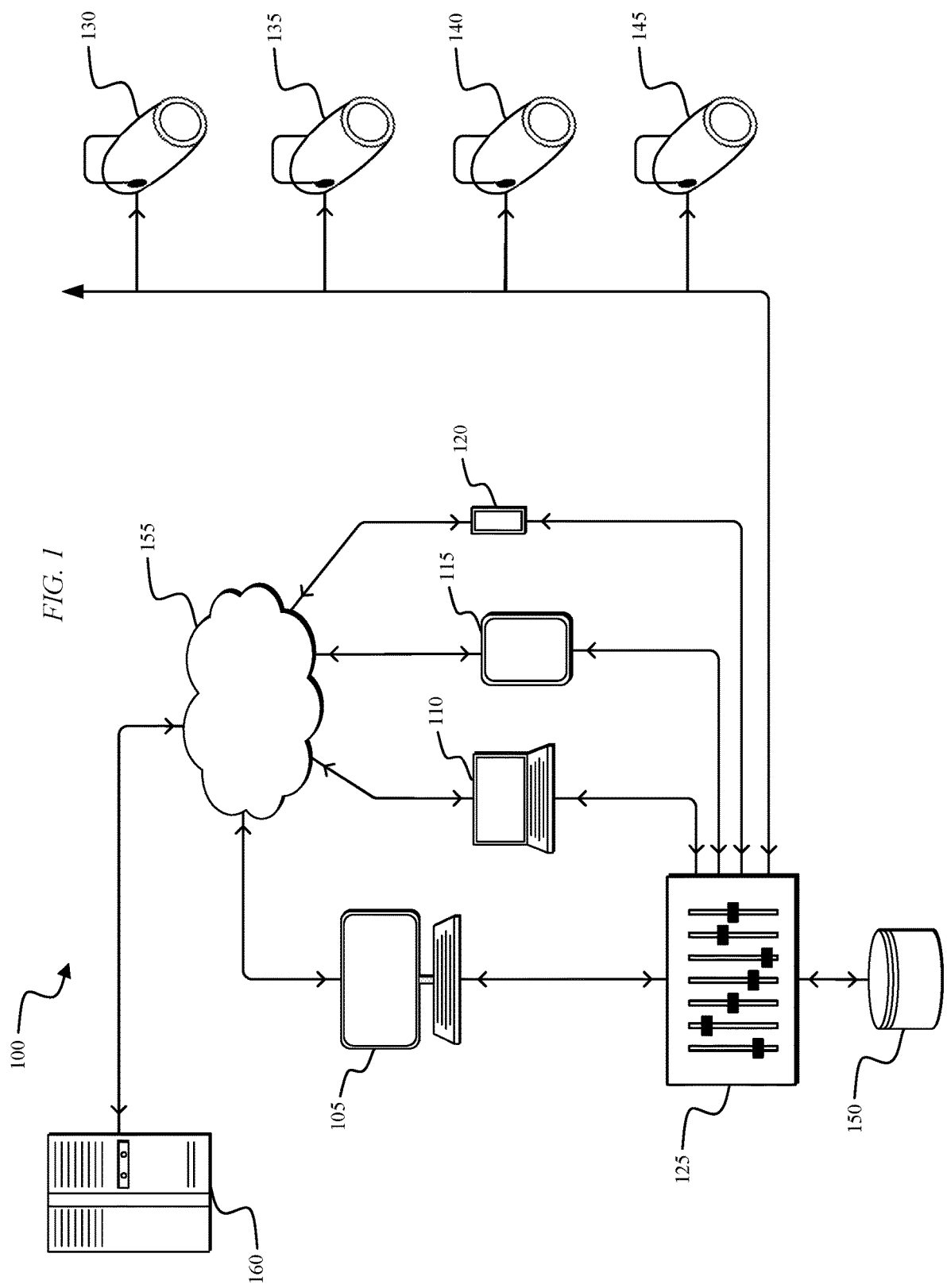
FIG. 1 illustrates a lighting system 100 for controlling one or more light fixtures using lighting graphs, according to some embodiments.

Embodiments described herein provide for controlling the progression of lighting states in an automated or semi-automated lighting system where multiple transitions are allowed to originate from a single state of the lighting system. The lighting states and transitions may be represented in a lighting graph rather than a cue list. Traditional cue lists provide for sequential execution of lighting states. Lighting graphs provide for non-sequential and conditional execution of lighting states where each state (or node) within a lighting graph can have multiple points of entry (e.g., input transitions) from other states and multiple points of egress (output transitions) to other lighting states. The transitions represent how a current state progresses to a target state in a lighting system.

The lighting graph technique of control provides for conditionally or unconditionally selecting a next state from a plurality of possible states (e.g., a conditional transition) thereby allowing a lighting system to play back a show in a more intelligent or sophisticated way when the show is affected by varying or unexpected conditions and events. Light control based on a lighting graph can be automated, conditional, manual, or a combination of the above. For example, a lighting graph state transition process may include portions that proceed in a predetermined manner and also have portions that proceed automatically based on internal conditions of the system (e.g., the level of a fader, a light fixture intensity, color output, fog machine control, the number of fixtures available, etc.) and/or conditions external to the system (e.g., wind speed or direction, ambient light level, sound level, pitch, or cadence, etc.). In circumstances where a transition is not achievable due to an internal or external condition, an alternative or default transition can automatically be implemented (e.g., continue using the current lighting parameters).

In some embodiments, a user can select state transitions from a filtered set of available transitions that are visually represented in a graphical user interface ("GUI"). The lighting system may filter lighting state transition paths based on user input or other decision making in the system. For example, the system may determine valid paths for transitioning from state A to state B to state D and from state A to state C to state D and present those paths for selection in a GUI. However, transitioning from state A directly to state D may not be permissible due to current lighting parameters of the system. As a result, the GUI does not make the transition directly from state A to state D available for selection by a user. Moreover, the GUI provides options for user input for manually overriding the filtered set of transitions represented in the GUI. For example, a manual override input may result in a fallback transition from a current lighting state to a default lighting state that is implemented instead of a planned or programmed transition. In some embodiments, the GUI provides options for user input to manually override a condition that is in place for transitioning from a first state to a second state such that the system transitions to the second state even when the condition is not met.

FIG. 1 illustrates a lighting system 100 for controlling one or more light fixtures using lighting graphs. The lighting system 100 includes a plurality of user input devices 105-120, a control board or control panel 125, a first light fixture 130, a second light fixture 135, a third light fixture 140, a fourth light fixture 145 (i.e., the light fixtures 130-145), a database 150, a network 155, and a server-side computer or server 160. The plurality of user input devices 105-120 include, for example, a personal or desktop computer 105, a laptop computer 110, a tablet computer 115, and a mobile phone (e.g., a smart phone) 120.

Each of the devices 105-120 is configured to communicatively connect to the server 160 through the network 155 and provide information to, or receive information from, the server 160 related to the control or operation of the lighting system 100. Each of the devices 105-120 is also configured to communicatively connect to the control board 125 to provide information to, or receive information from, the control board 125. The connections between the user input devices 105-120 and the control board 125 or the network 155 are, for example, wired connections, wireless connections, or a combination of wireless and wired connections. Similarly, the connections between the server 160 and the network 155, or between the control board 125 and the light fixtures 130-145 are wired connections, wireless connections, or a combination of wireless and wired connections.

The network 155 is, for example, a wide area network ("WAN") (e.g., a TCP/IP based network), a local area network ("LAN"), a neighborhood area network ("NAN"), a home area network ("HAN"), or a personal area network ("PAN") employing any of a variety of communication protocols, such as Wi-Fi, Bluetooth, ZigBee, etc. In some implementations, the network 155 is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a 4G LTE network, a 5G New Radio, a Digital Enhanced Cordless Telecommunications ("DECT") network, a Digital AMPS ("IS-136/TDMA") network, or an Integrated Digital Enhanced Network ("iDEN") network, etc.

Figure 2:
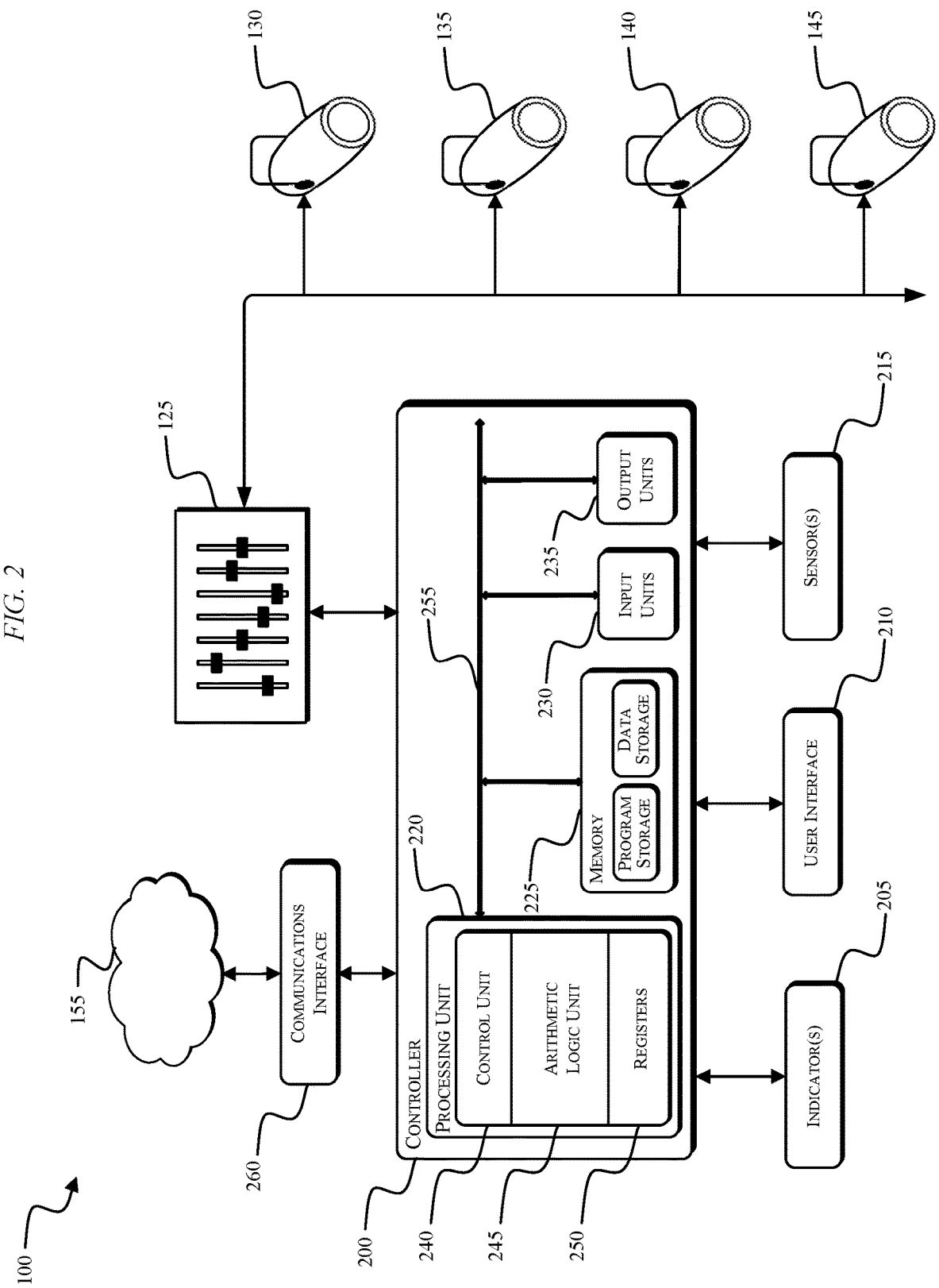
FIG. 2 illustrates a controller for the lighting system of FIG. 1, according to some embodiments.

FIG. 2 illustrates a controller 200 for the lighting system 100. The controller 200 is electrically and/or communicatively connected to a variety of modules or components of the lighting system 100. For example, the illustrated controller 200 is connected to one or more indicators 205 (e.g., LEDs, a liquid crystal display ["LCD"], etc.), a user input or user interface 210 (e.g., a user interface of the user input device 105-120 of FIG. 1), and one or more sensors 215 (e.g., current sensor, microphone, optical sensor, anemometer, etc.). The controller 200 is also connected to the control board 125 and a communications interface 260. The communications interface 260 is connected to the network 155 to enable the controller 200 to communicate with the server 160. The controller 200 includes combinations of hardware and software that are operable to, among other things, control the operation of the lighting system 100, control the operation of the light fixtures 130-145, communicate over the network 155, communicate with the control board 125, receive input from a user via the user interface 210, provide information to a user via the indicators 205, etc.

In the embodiment illustrated in FIG. 2, the controller 200 is associated with one of the user input devices 105-120. As a result, the controller 200 is illustrated in FIG. 2 as being connected to the control board 125 which is, in turn, connected to the first light fixture 130, the second light fixture 135, the third light fixture 140, and the fourth light fixture 145. In other embodiments, the controller 200 is included within the control board 125, and, for example, the controller 200 can provide control signals directly to the first light fixture 130, the second light fixture 135, the third light fixture 140, and the fourth light fixture 145. In other embodiments, the controller 200 is associated with the server 160 and communicates through the network 155 to provide control signals to the control board 125 and the first light fixture 130, the second light fixture 135, the third light fixture 140, and the fourth light fixture 145.

The controller 200 includes a plurality of electrical and electronic components that provide power, operational control, and protection to the components and modules within the controller 200 and/or the lighting system 100. For example, the controller 200 includes, among other things, a processing unit 220 (e.g., a microprocessor, a microcontroller, or another suitable programmable device), a memory 225, input units 230, and output units 235. The processing unit 220 includes, among other things, a control unit 240, an arithmetic logic unit ("ALU") 245, and a plurality of registers 250 (shown as a group of registers in FIG. 2), and is implemented using a known computer architecture (e.g., a modified Harvard architecture, a von Neumann architecture, etc.). The processing unit 220, the memory 225, the input units 230, and the output units 235, as well as the various modules or circuits connected to the controller 200 are connected by one or more control and/or data buses (e.g., common bus 255). The control and/or data buses are shown generally in FIG. 2 for illustrative purposes. The use of one or more control and/or data buses for the interconnection between and communication among the various modules, circuits, and components would be known to a person skilled in the art in view of the embodiments described herein.

The memory 225 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 220 is connected to the memory 225 and executes software instructions that are capable of being stored in a RAM of the memory 225 (e.g., during execution), a ROM of the memory 225 (e.g., on a generally permanent basis), or another non-transitory computer readable medium such as another memory or a disc. Software included in the implementation of the lighting system 100 and controller 200 can be stored in the memory 225 of the controller 200. The software includes, for example, firmware, one or more applications, program data, filters, rules, one or more program modules, lighting graphs, lighting states, lighting parameters, lighting instructions, and other executable instructions. The controller 200 is configured to retrieve from the memory 225 and execute, among other things, instructions and queries related to the control processes and methods described herein. In other embodiments, the controller 200 includes additional, fewer, or different components.

The user interface 210 is included to provide user control of the lighting system 100 and/or light fixtures 130-145. The user interface 210 is operably coupled to the controller 200 to control, for example, drive signals provided to the light fixtures 130-145. The user interface 210 can include any combination of digital and analog input devices required to achieve a desired level of control for the lighting system 100. For example, the user interface 210 can include a computer having a display and input devices, a touch-screen display, a keyboard, a plurality of knobs, dials, switches, buttons, faders, or the like. In the embodiment illustrated in FIG. 2, the user interface 210 is separate from the control board 125. In other embodiments, the user interface 210 is included in the control board 125.

The sensors 215 are connected to the controller 200 and are operable to detect events or conditions that occur within the lighting system 100 or in a physical environment associated with the lighting system 100 (e.g., external to the lighting system 100). The sensors 215 may include one or more sensors including a current sensor, a microphone, an optical sensor, a camera, a rhythm sensor, a pitch sensor, a motion sensor, an anemometer, or the like. The sensors 215 may be physically integrated with the controller 200, the control board 125, and/or one or more of the light fixtures 130-145, or the sensors 215 may be separate or remotely located. For example, the sensors 215 may be positioned in a theater, on a stage, or in another interior or exterior space. Outputs from the sensors 215 may be utilized for controlling the lighting system 100 and/or the light fixtures 130-145, for example, as inputs for driving light fixture operations.

Figure 3:
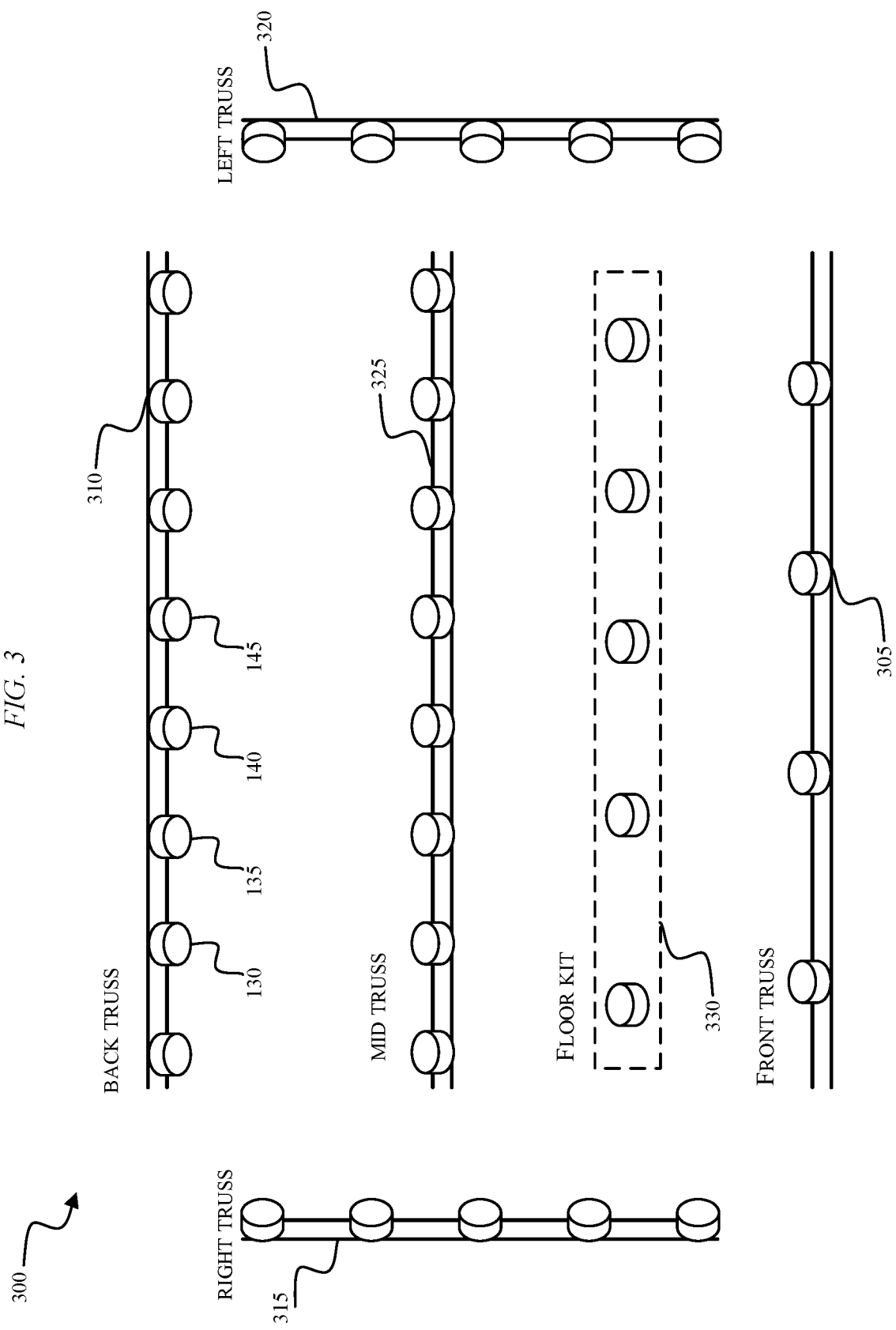
FIG. 3 is a map including an example of light fixtures distributed in a lighting system, according to some embodiments.

FIG. 3 is a map including an example of light fixtures distributed in a lighting system. In this example, a map 300 represents light fixtures that are attached to trusses of a lighting rig system, which may be assembled on a stage, in a theatre, or at an outdoor concert, for example. The map 300 includes five trusses for securing the light fixtures including a front truss 305, a back truss 310, a stage right truss 315, a stage left truss 320, and a middle truss 325. The map 300 also includes a floor kit 330. Numerous light fixtures are attached to the trusses including the light fixtures 130-145 that are attached to the back truss 310. In general, the light fixtures are mapped to various locations on the stage for providing various types of lighting effects and functions. For example, wash lights provide a broad or unfocused beam of light and are positioned in the trusses to light a large area of the stage. Spotlights are positioned in the trusses to illuminate a narrow or hard edged area such as an ellipse on the stage. The spotlights may be directed to a specific location, for example, where a lead singer stands or where a drum kit is positioned. Dot lights are positioned in the floor kit 330 and may emit a narrow beam of light to highlight a particular object, such as a musical instrument. Blinder light fixtures are positioned in the floor kit 330 and may be utilized to illuminate an area of an audience. As shown in FIG. 3, the light fixtures 130-145 are attached to the back truss 310. Although FIG. 3 represents light fixtures attached to trusses on a stage or located on the floor of the stage, the disclosure is not limited in this regard, and the lights or light fixtures may be positioned in any type of indoor, outdoor, stationary, or mobile environment. Also, the light fixtures may be mechanically supported or may be positioned in the environment in any suitable manner. The light fixtures 130-145 may be driven based on lighting parameters. Lighting parameters may indicate, for example, an on or off switch, a light color or palette, a light intensity, a movement or spatial orientation of a light fixture, a focus level, a gobo selection, and changes to theses parameters over time.

Figure 4A:
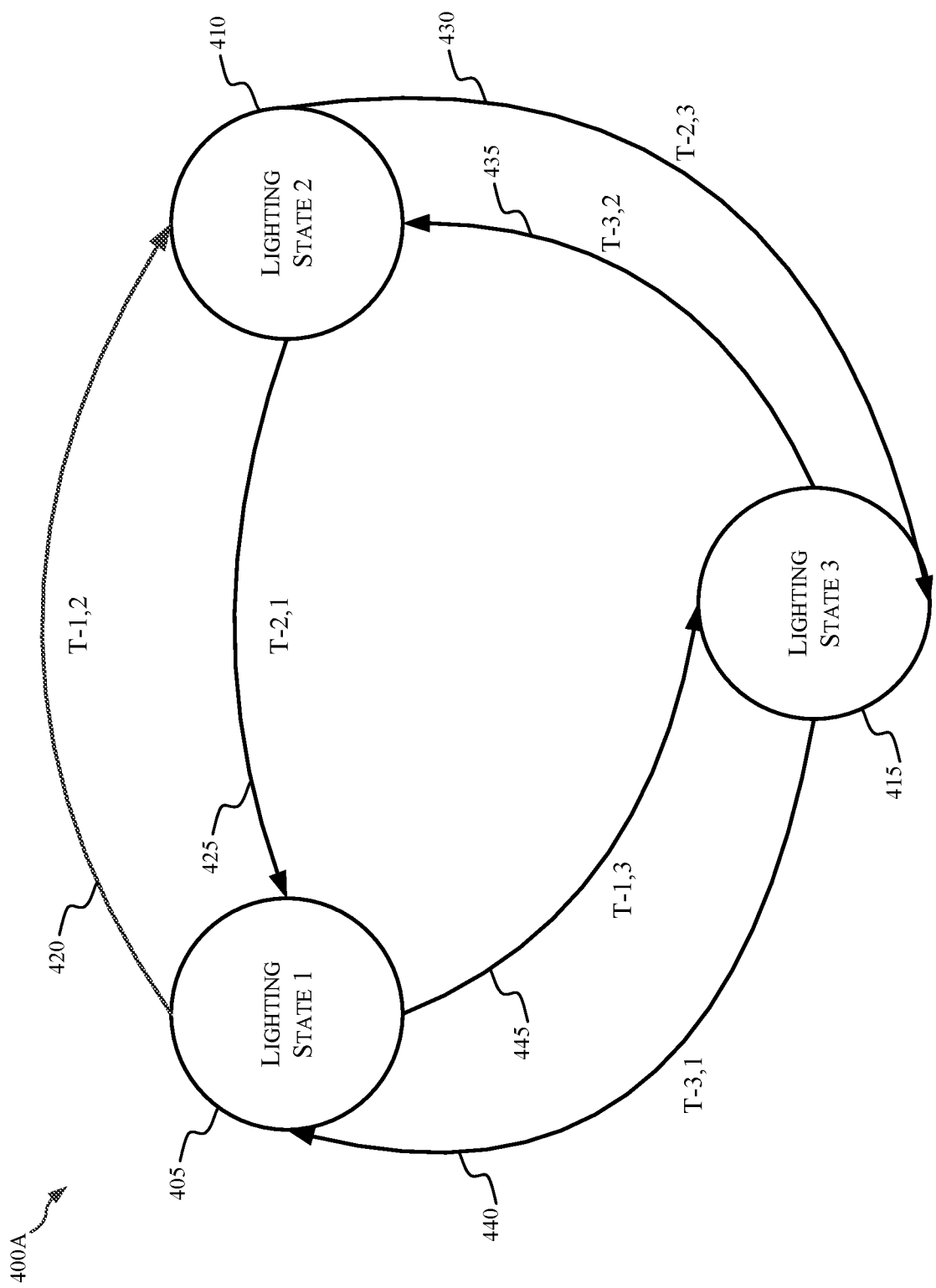
FIG. 4A illustrates a lighting graph representing lighting states and possible transitions between the lighting states, according to some embodiments.

FIG. 4A is an illustration of a lighting graph 400A that represents lighting states and transitions between the lighting states. For ease of illustration, the lighting graph 400A includes only three states 405, 410, and 415. The lighting graph 400A also includes directed transition paths from each state to every other state including path 420 from state 405 to state 410, path 425 from state 410 to state 405, path 430 from state 410 to state 415, path 435 from state 415 to state 410, path 440 from state 415 to state 405, and path 445 from state 405 to state 415. Each of the lighting states may be reached from all of the other lighting states and each may have multiple ports of entry and multiple ports of egress. For example, state 405 may be reached from state 410 or 415 and may transition to state 410 or 415. Also, state 415 may be reached from state 405 directly or by transitioning first to state 410 and then from state 410 to state 415. Although the state graph 400A represents only three states 405, 410 and 415, the graph may be extended to any number of states with possible transition paths from each state of the graph to every other state of the graph. The number of states and state transition paths representing a particular lighting program may be limited to the number of states and state transitions designed for the particular program. For example, a lighting program may be designed to have one hundred lighting states and each lighting state may have at least 10 ports of entry from 10 different states of the graph and at least 10 ports of egress to 10 different states of the graph.

Figure 4B:
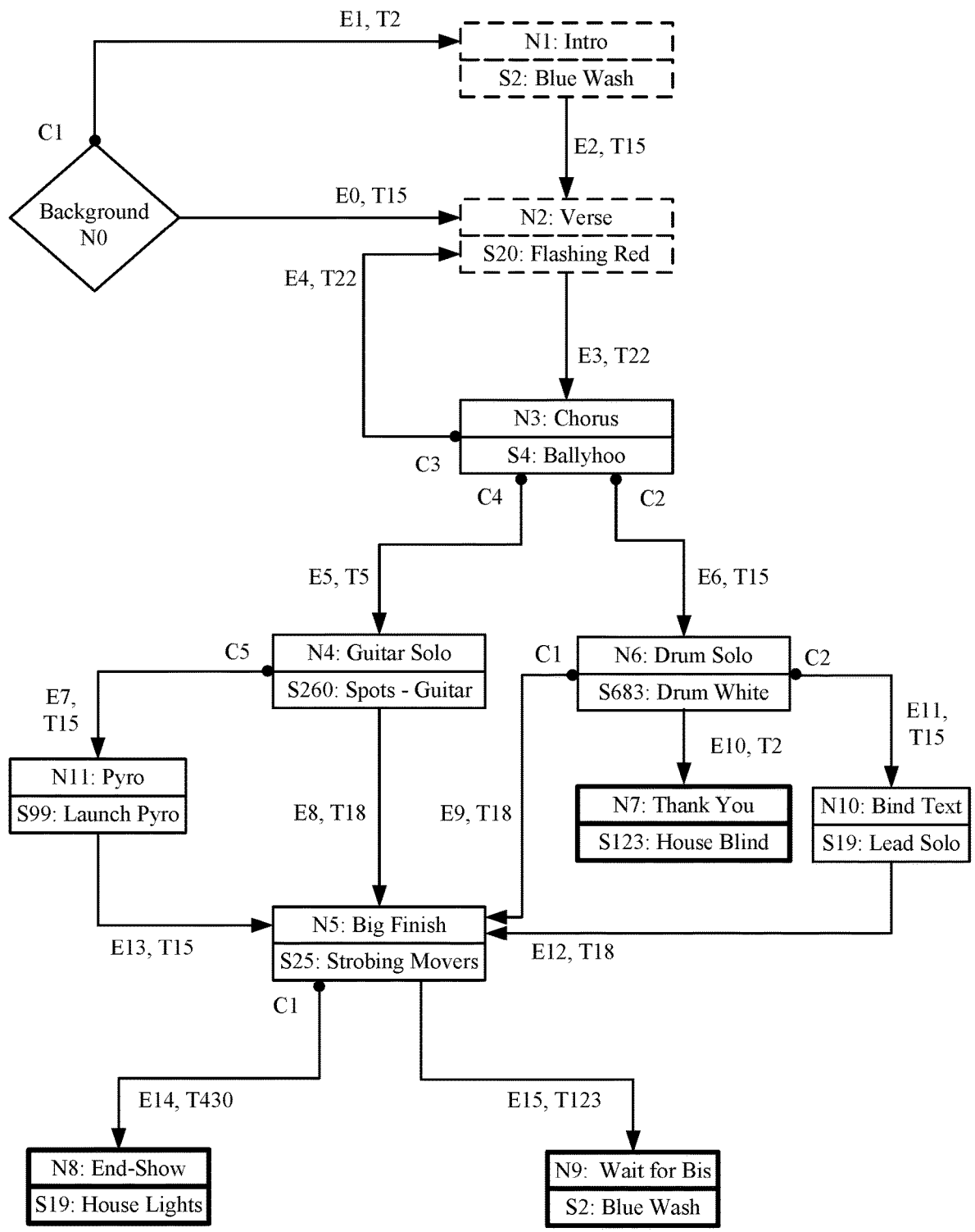
FIG. 4B illustrates a lighting graph that includes nodes, edges, and conditions that refer respectively to specified lighting states, transitions between lighting states, and conditions to be met before allowing a transition to proceed, according to some embodiments.

FIG. 4B illustrates an example lighting graph 400B that includes nodes, edges, and conditions that refer respectively to specified lighting states, transitions between lighting states, and conditions to be met before allowing a transition to proceed. The nodes of the lighting graph 400B include a background node N0 that represents a current or initial state of the lighting system 100 (e.g., based on the light console 125) prior to entering the lighting graph and may not specify any particular lighting state. The nodes N1-N11 each refer to a lighting state (e.g., a lighting scene, or a lighting state object) of the lighting system 100. The lighting states include various parameters (see below) for light fixtures or other effect devices that are controlled by the system 100 (e.g., smoke generating devices, pyro-technology devices, etc.). Table 1 lists the nodes of the lighting graph 400B and corresponding lighting states that are assigned to (i.e., referenced by) the nodes. Multiple nodes may refer to the same lighting state such that a lighting state may be reused, or assigned to different nodes. For example, in the lighting graph 400B, the state S2: Blue Wash is assigned to nodes N1 and N9.

States of the a lighting graph 400B may be independent (i.e., non-tracking) or cumulative (i.e., tracking). For example, as nodes or states of the lighting graph 400B are played back in a non-tracking manner, each node refers to or specifies all of the lighting effects to be executed during the state, and the effects do not persist into the next state unless specified in the next state. In some embodiments, an example State_A specifies light 1 at 100% intensity, State_B specifies light 2 at 100% intensity, and State_C specifies light 3 at 100% intensity. In a non-tracking play back behavior, during State_A, only light 1 would illuminate at 100%, during State_B, only light 2 would illuminate at 100%, and during State_C, only light 3 would illuminate at 100%. When the nodes or states are played back in a tracking manner, the lighting effects executed in one state persist into a next states such that the lighting effects accumulate as the play back proceeds through multiple states. As a result, each lighting state specifies changes relative to the prior lighting state. For example, for play back of the above example lighting states with tracking enabled, during State_A, only light 1 would illuminate at 100%, during State_B, light 1 and light 2 would illuminate at 100%, and during State_C, light 1, light 2, and light 3 would illuminate at 100%.

As shown in the lighting graph 400B, various paths may be traversed through the graph, and multiple nodes of the graph function as terminal nodes (e.g., start nodes or end nodes). For example, nodes N1 and N2 can each function as a start node, where paths from the background node N0 can follow the edge E0 to node N1 or the edge E1 to node N2. The start nodes each refer to a pre-defined behavior (e.g., state) that provides an entry point from which to run the lighting graph 400B. The nodes N7, N8, and N9 can each function as an end node. When a lighting show arrives at an end node, active states of the light fixtures and/or other devices can be exited or decay in a specified manner, according to a default transition, or in accordance with real-time user input. For example, a user may trigger a release and die gracefully behavior when an end node is reached where everything that is currently playing-back, or input by the user, gradually diminishes to a deactivated state.

As shown in the lighting graph 400B, multiple edges may enter a node and multiple edges may exit a node. Although the lighting graph 400B shows various edges between the nodes represented in the graph, the disclosure is not limited in this regard. For example, depending on design of the lighting graph, or manual input, a node in a lighting graph may receive edges from any or all of the other nodes in the graph, and the node may extend edges to any or all of the other nodes in the graph. Furthermore, the number of nodes in a graph is not limited, and any number of nodes may be included.

TABLE 1

Nodes and States of the Lighting Graph 400B of FIG. 4B

| Node ID | Node Description | Node Type | Assigned State | State Description |
|---|---|---|---|---|
| N0 | Background | Background | None | None |
| N1 | Intro | Body | S2 | Blue Wash |
| N2 | Verse | Start Node | S20 | Flashing Red |
| N3 | Chorus | Body | S4 | Ballyhoo |
| N4 | Guitar Solo | Body | S260 | Spots on Guitar |
| N5 | Big Finish | Body | S25 | Strobing Movers |
| N6 | Drum Solo | Body | S683 | Drum White |
| N7 | Thank you | End Node | S123 | House Blind |
| N8 | End-Show | End Node | S19 | House Lights |
| N9 | Wait for Bis | End Node | S2 | Blue Wash |
| N10 | Bind Text | Body | S19 | Lead Solo |
| N11 | Pyro | Body | S99 | Launch Pyro |

The edges of the graph 400B include edges E0-E15. An edge can refer to a transition (or transition object) that is stored in the memory 225 with parameters for lighting behavior that occur when traversing between one node (or state) and another node. Table 2 lists the edges of the lighting graph 400B and corresponding lighting transitions that are assigned to the edges. A transition is a phase between nodes that may take time to execute. Light fixtures and other devices can execute a transition over a time duration that is specified in the transition. The transitions may include parameters for one or more particular fixtures or devices, for a type or group of fixtures or devices, or for system wide fixtures or devices. Transition parameters define fixture behavior (e.g., a color conversion, fixture movement, intensity, etc.) and may include timing parameters. For example, parameters of a transition can specify that all active lights fade over 5 seconds following an exponential curve (e.g., fading slower in the beginning and faster in the end). In another example, a transition specifies a color conversion for a first light fixture over 4 seconds, a color conversion for a second fixture in 6 seconds, movement of the first and second light fixtures over 2 seconds, and intensity change in the first light fixture over 10 seconds and in all other active light fixtures over 15 seconds.

The transitions in a lighting graph may be reused or reassigned to multiple edges (e.g., one transition can be referred to from multiple edges of a lighting graph). For example, the transition T15: Snap is shown in FIG. 4B as being assigned to the edges E0, E2, E6, E7, E10, and E11.

Activation of a transition may be conditional or unconditional (e.g., based on conditions within the lighting system 100, external conditions, or conditions met by user input to the system 100). Conditional transitions are indicated in FIG. 4B by a black circle on an edge, and a condition identifier (e.g., C1-C5). Generally, the behavior of transition is considered unconditional when user input is received by the controller 200 to play back states and/or transitions, or when states in a lighting graph are traversed in a default or known progression without evaluation of a condition prior to proceeding. In other embodiments, a different symbol (e.g., a square, a triangle, etc.) can be used in place of the circle to indicate a conditional transition.

Transitions specified in a scene graph may be overridden by user input and transitions that are not defined in the scene graph may be forced or implemented based on user input (e.g., received from the user interface 210 or console 125). Although the edges of FIG. 4B indicate a direction from one node to another node, the direction may be overridden or reversed based on user input. For example, the user interface 210 or console 125 may receive input from a user to force an undefined transition from node N4 to node N3. The user input can specify which transition to apply, such as, a transition or edge from N4 to N3 using transition T2: Slow Fade. In cases where there are no user defined transition parameters indicated for going from one node (or state) to another node (or state) or when a condition is not met, the controller 200 may use a fallback mechanism such as a default transition. Default transitions may be defined at varying levels of granularity. For example, a default transition may be defined broadly to cover all active fixtures or devices in the system 100 (system wide), such as specifying that all lighting changes between two nodes occur within 2 seconds for a smooth transition. In some embodiments, default transitions are defined for particular light fixtures or for exceptions to a system wide default transition. For example, moving fixtures may be assigned a longer default transition time to protect motors used to move the fixtures. In another example, a default setting for transitioning from states with active strobe lights or audience blinders specifies to turn-off the lights immediately to quickly discontinue effects that are irritating to an audience. In another example, for pyro-technology effects that are controlled by the console 125, a specific default transition from an active state is configured to turn-off the pyro-effects immediately for safety reasons.

TABLE 2

Edges and Transitions of the Lighting Graph 400B of FIG. 4B

| Edge | Edge Description | Edge Type | Assigned Transition | Transition Description |
|---|---|---|---|---|
| E0 | Fast Start | Unconditional | T15 | Snap |
| E1 | Slow Walk-in | Conditional (C1) | T2 | Slow Fade |
| E2 | Drum hit | Unconditional | T15 | Snap |
| E3 | Mv Chorus | Unconditional | T22 | Fast Fade |
| E4 | Loop 4X | Conditional (C4) | T22 | Fast Fade |
| E5 | Solo | Conditional (C5) | T5 | Star Wipe |
| E6 | To Drum | Conditional (C2) | T15 | Snap |

TABLE 2-continued

Edges and Transitions of the Lighting Graph 400B of FIG. 4B

| Edge | Edge Description | Edge Type | Assigned Transition | Transition Description |
|---|---|---|---|---|
| E7 | Only Outdoor | Conditional (C5) | T15 | Snap |
| E8 | Generic | Unconditional | T18 | Medium Fade |
| E9 | Generic | Conditional (C1) | T18 | Medium Fade |
| E10 | Generic | Unconditional | T2 | Slow Fade |
| E11 | Generic | Conditional (C2) | T15 | Snap |
| E12 | Generic | Unconditional | T18 | Medium Fade |
| E13 | Auto Follow | Unconditional | T15 | Snap |
| E14 | Generic | Conditional (C1) | T430 | Horizontal Swipe |
| E15 | Generic | Unconditional | T123 | Left Swipe |

Conditions of the lighting graph 400B include C1-C5, which are applied to edges (or transitions) of the lighting graph 400B. Table 3 includes a list of conditions (or condition identifiers) of the lighting graph 400B and corresponding specified conditions (e.g., rules or events that are evaluated or tested) that are associated with the condition identifiers. In the memory 225, the conditions C1-C5 refer to the specified conditions (e.g., condition objects) that are stored as separate objects from the state objects and transition objects. The conditions refer to the specified conditions or events that must be met before an associated transition can be applied to progress from one node (or state) to another node. The specified conditions may be reused on multiple edges or transitions in a lighting graph. For example, C1: Circle Key is applied to the edges E1, E9, and E14 and is used for the transitions from N0 to N1, from N6 to N5, and from N5 to N8 in the lighting graph 400B. The object for the condition C1 specifies that the controller 200 must receive user input via a particular key on the console 125 or the user interface 210 before proceeding to the next node. In some embodiments, a node has multiple transitions or edges defined and different conditions are associated with the different edges. For example, node N3 has three edges (E4, E5, and E6) defined for exiting the node and proceeding to one of three other nodes (N2, N4, and N6, respectively). Three conditions (C3, C4, and C2) are associated with the three edges for the processing unit 220 to consider before determining which edge to proceed on.

The condition C3 is applied to edge E4 and specifies that a variable (Loop_var) must be greater than zero in order for the play back of lighting states to loop back from node N3 to node N2. The condition C4 is applied to the edge E5 and specifies that, if the variable (Loop_var) is equal to zero, the play back proceeds on the edge E5 to node N4. The condition C2 specifies that if user input is received via the square key in the console 125 or user interface 210, the play back proceeds on edge E6 to node N6. As described in more detail below, the specified conditions may be based on conditions internal to the system 100, external conditions, or conditions met by input received by the system 100. In another example, the node N4 has two defined edges for exiting the node. The edge E7 to node N11 (launch pyrotechnology effects) is conditional based on the condition C5 and the edge E8 is unconditional. The condition C5 specifies that an external variable (Outdoor_var) must equal true and user input must be received from the circle key of the console 125 or the user interface 210. For example, the venue must be outdoors and the user must request activation of the pyro-devices in order to launch the pyro devices. If these two conditions are not met, the play back of lighting states proceeds on edge E8 to node N5 to activate strobing movers. In some embodiments, a different external variable or external condition is associated with the condition C5.

In other embodiments, the play back of lighting states branches to one of multiple edges exiting a node depending on which user input key is selected by a user at the console 125 or the user interface 210. In some embodiments, a condition may be overridden based on input received via the user interface 210 or console 125, such that a transition is executed even though the specified condition has not been met. For example, lighting state play back may proceed from node N3 to node N2 on edge E4 even though the controller 200 has not determined that the variable Loop_var is greater than zero when the controller receives override input from the user interface 210.

TABLE 3

Conditions and Condition Descriptions of the Lighting Graph 400B of FIG. 4B

| Condition | Condition Description |
|---|---|
| C1 | Circle Key |
| C2 | Square Key |
| C3 | Loop_var > 0 |
| C4 | Loop_var = 0 |
| C5 | Outdoor_var = true AND Circle Key |

Figure 5:
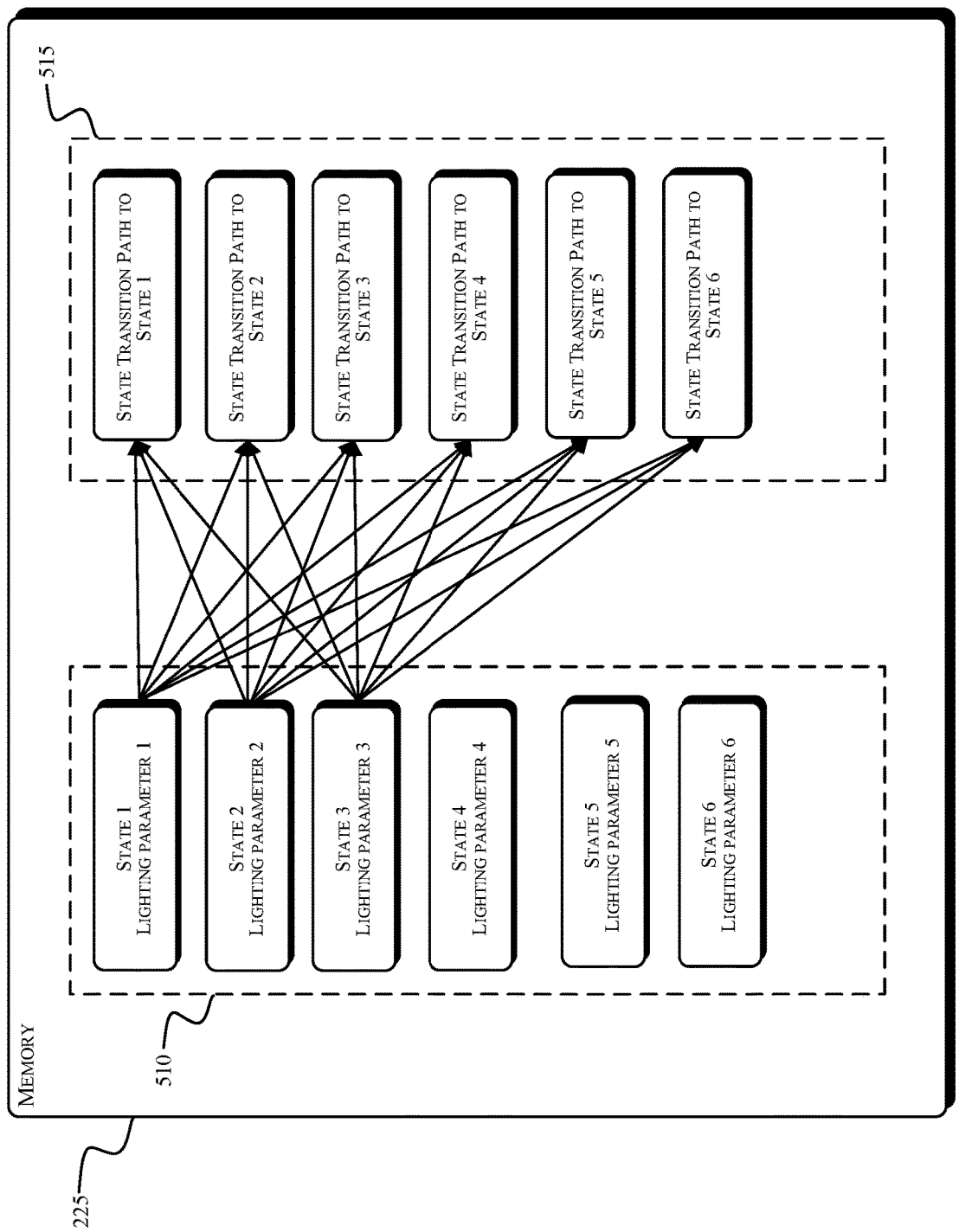
FIG. 5 illustrates memory elements in a lighting control system that store information for controlling one or more light fixtures based on a lighting graph, according to some embodiments.

FIG. 5 illustrates memory elements in a lighting control system that store information for controlling one or more light fixtures based on a lighting graph. FIG. 5 includes the memory 225 of the lighting system 100 and also represents storage in the database 150. The memory 225 (or database 150) stores a plurality of lighting states 510, a plurality of lighting state transition paths 515, and/or a plurality of transition conditions (not shown). As indicated by the arrows shown in FIG. 5, each of the lighting states 510 may be associated in the memory 225 (and/or the database 150) with any of the other lighting states 510 based on the directed state transition paths 515. For ease of illustration, only the associations from the first three of six shown states 510 are shown. However, the pattern of associations may be repeated for states 4-6 as well. The lighting states 510, the state transition paths 515, and their associations may be stored in the memory 225 (and/or the database 150) based on user input via the user interface 210 or the control board 125, or they may be received from another system such as the server 160 or the user input devices 105-120, for example.

Although a lighting program based on a lighting graph can ideally branch from one state to any other state according to a graph structure, conditions known to or provided to the lighting system 100 may limit which states are available for an originating state to be transitioned to another state.

Each of the plurality of lighting states 510 includes information for identifying one or more light fixtures 130-145, for example, light fixture identifiers (ID), light fixture locations, or queries for looking up light fixtures. Each of the plurality of lighting states 510 also includes lighting parameters, for example, information utilized by the controller 200 for generating drive signals to be sent to the identified light fixtures for controlling the output of the light fixture based on the current state.

The lighting parameters of a particular lighting state 510 indicate functions, operations, or qualities that a light fixture or a number of light fixtures 130-145 are to perform or achieve while the lighting system 100 is executing the particular lighting state. For example, the lighting parameters may indicate switching a light "on" or "off," illumination of a particular color or a palette, a light intensity, a movement or spatial orientation of a light fixture, a focus level of a light, a gobo selection, and the like. The lighting parameters may also indicate changes over time, for example, dimming, intensifying, flashing, or changing color over a specified period of time, at a specified rate, or for a specified time curve. In some embodiments, the lighting parameters included in the states 510 may include a light design program, or lighting pre-set instructions such as a script or a macro called when a lighting state 510 is executed. In some embodiments, a lighting parameter of a first lighting state 510 may indicate "light fixture 130: color blue at 100% intensity," specifying that blue channels of the light fixture 130 should be illuminated at their fullest intensity. In another example, a lighting parameter of a particular lighting state 510 indicates "light fixtures 130-145: dim, 10 seconds" indicating that the intensity of lamp output in the light fixtures 130-145 should be lowered from a current intensity level to zero intensity over 10 seconds.

When the controller 200 executes a particular lighting state 510, the lighting parameters indicated by the particular lighting state 510 are processed by the processing unit 220, which initiates transmission of drive signals to the light fixtures identified in the particular lighting state 510 (e.g., the light fixtures 130-145) via the control board 125. The drive signals may be transmitted via a wired or wireless link. The identified light fixtures then receive the drive signals and execute the functions indicated by the drive signals to control output of the light fixtures according to the particular state. Transitions stored in the memory 225 also include lighting parameters for executing a transition between states. Transition parameters may include similar parameters as a state, which indicate lighting functions, operations, qualities, and timing specifications for generating drive signals to the one or more light fixtures or other devices for executing a transition between states.

Figure 6A:
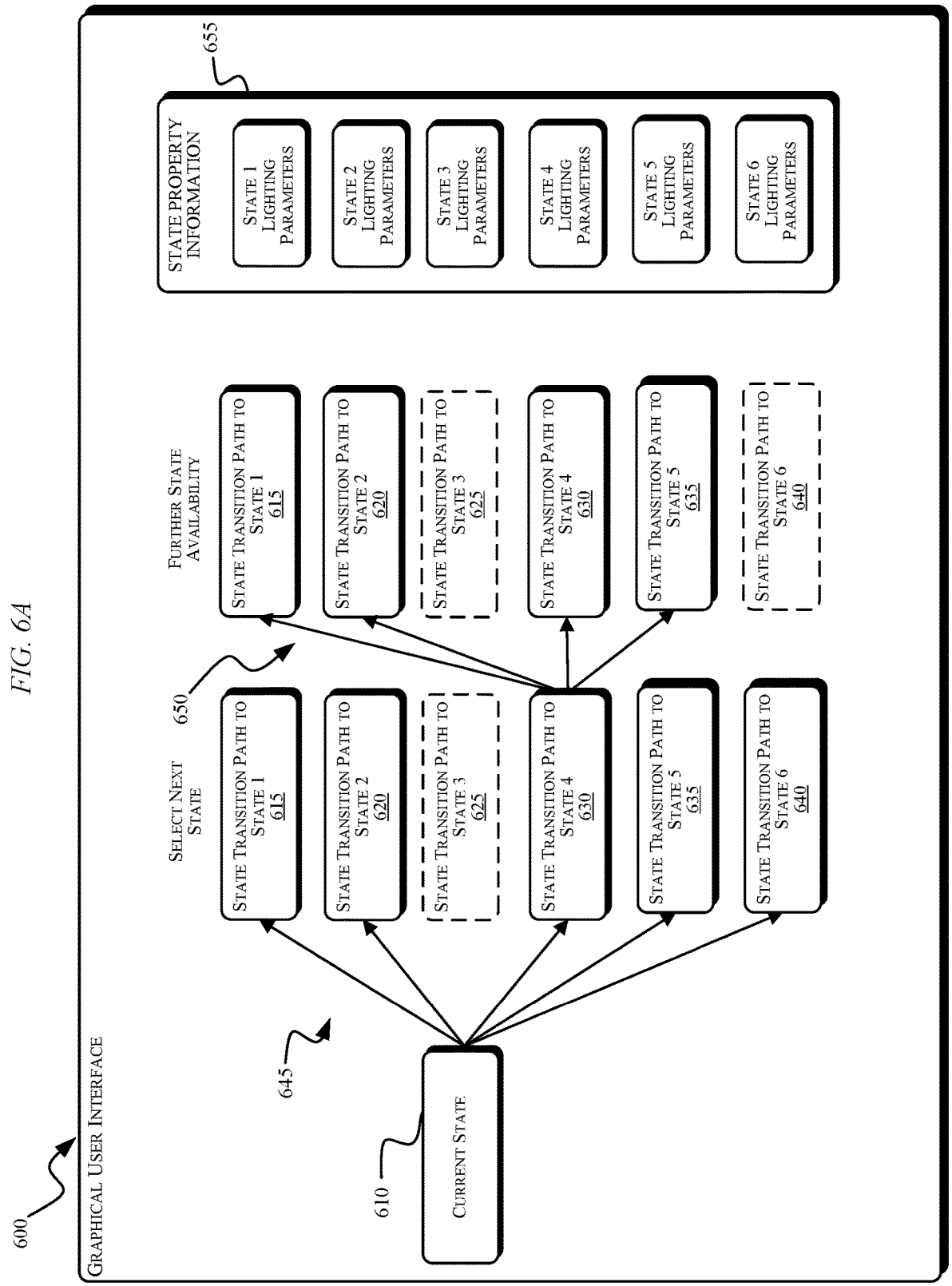
FIGS. 6A and 6B illustrate examples of graphical user interfaces for controlling a lighting system based on a lighting graph, according to some embodiments.
Figure 6B:
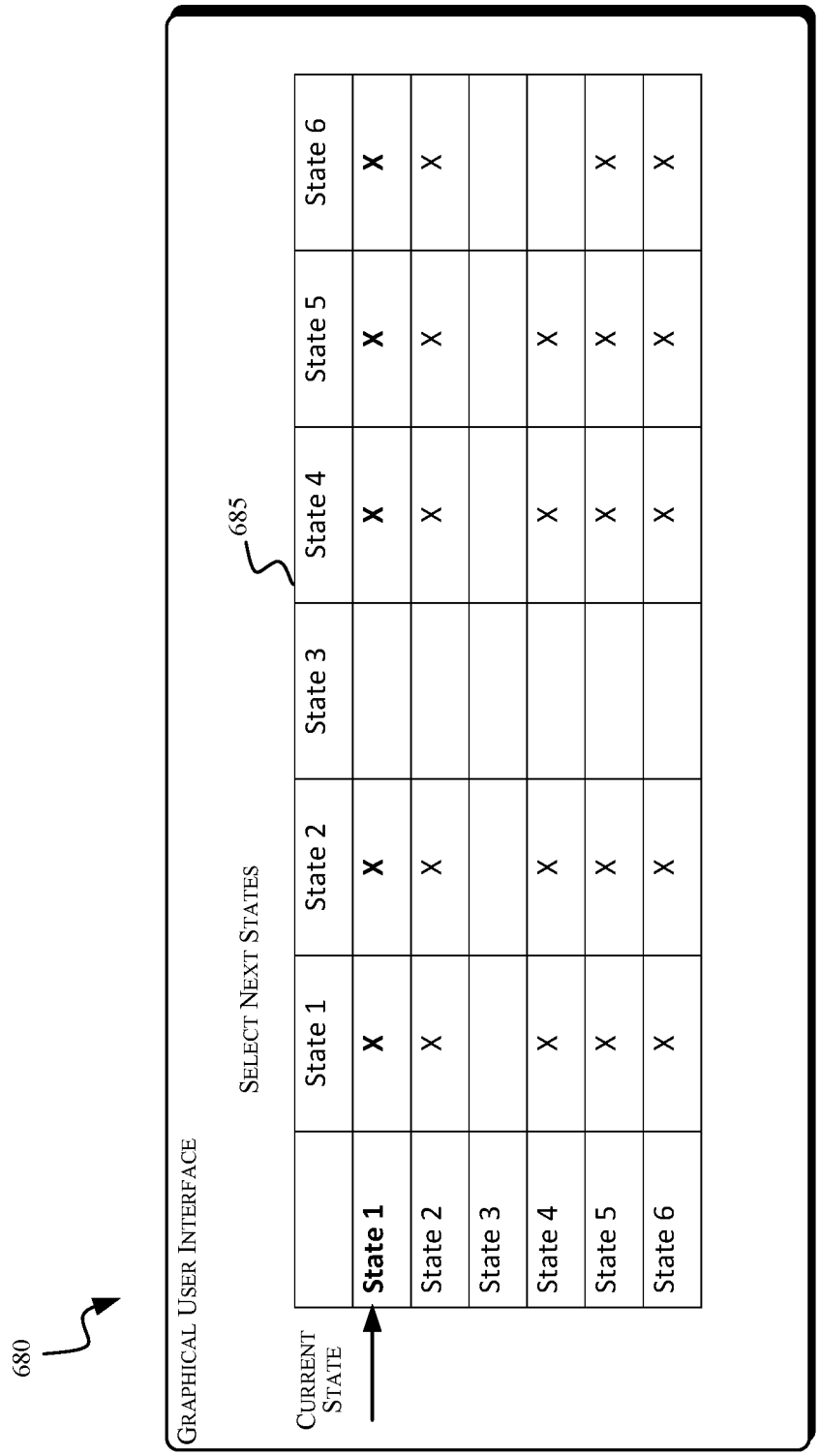

FIGS. 6A and 6B illustrate two examples of GUIs that may be used for controlling the lighting system 100 based on a lighting graph. FIGS. 6A and 6B include GUIs that allow a user to select a next state from a plurality of available next states. The GUIs visually or audibly indicate to the user which states are available for selection based on, for example, conditions known internally by the system 100 or external conditions detected by or communicated to the system 100. Referring to FIG. 6A, a GUI 600 includes a current state 610 GUI element and a plurality of selectable next state GUI elements including next state elements state 1, 615, state 2, 620, state 3, 625, state 4, 630, state 5, 635, and state 6, 640 (i.e., next state selectable GUI elements 615-640). The current state 610 may be equivalent to one of the next states, for example, state 1, 615. A plurality of transition paths from the current state 610 to available next states, which are conditionally available for selection, are indicated by state transition path indicators 645. The GUI 600 also indicates which lighting states are not available for selection. For example, state 3, 625 is not available for selection, which is indicated by the dashed line around the state 3 GUI element. A plurality of transition path indicators 650 show which states are conditionally or unconditionally available for selection if state 4, 630 is selected for the next state from the current state 610 based on conditions known for having executed state 4, 630. For example, a cursor may be hovered over state 4, 630 to show which states would be available, based on conditions known at the time, if state 4 is selected as the next state.

Once a next state is selected, the GUI 600 is configured to update the screen and display the selected state as a current state 610, and display which states are available for next state selection from the selected state. Also, the transition path indicators 650 would be updated to indicate further state conditional or unconditional availability. Also shown in the GUI 600 are GUI elements 655 that provide information about the lighting states associated with the selectable elements 615-640. For example, the GUI elements 655 may list lighting parameters that that are used to control the light fixtures 130-145 when a lighting state is played back by the controller 200. In some embodiments, the GUI elements 655 may be selectable to provide additional information about a lighting state or lighting parameters, or to enable a user to modify a lighting state and its lighting parameters. For example, a user may modify a lighting state and its lighting parameters by identifying one or more light fixtures, adding or changing a script for one or more light fixtures, modifying a time delay, or specifying light property parameter for the selected lighting state via the GUI elements 655. The GUI 600 may also display which transitions are available for selection for transitioning between the states. In some embodiments, a user enters conditions within a lighting state or transition that must be met in order for the state or transition to be made available for selection. For example, for an outdoor venue, lighting states may be designed for daylight or nighttime conditions. The user defines conditions for the outdoor lighting states by defining ambient light conditions via the GUI elements 655. For example, a user selects one or more lighting states to edit and specify that a condition for transitioning to the one or more lighting states is that the ambient light must be above a threshold (e.g., daylight). During play back, the controller 200 would then read a light sensor 215, to determine if the condition was met before transitioning to the one or more lighting states. In some embodiments, the GUI 600 also allows a user to edit a state by including one or more default or alternate lighting states via the GUI elements 655 so that if a condition is not met for a particular lighting state during play back, the controller 200 transitions to an alternate state for which a condition is met, or transitions to a default state (e.g., such as staying in the current state).

In some embodiments, a plurality of states, transitions, and/or conditions to be played back during a lighting performance may be selected and saved in memory as a lighting performance program via the GUI 600. During play back, the controller 200 may test internal or external conditions and determine a next state relative to a current state, in real-time, based on the user's selections and results of the internal or external condition tests. Alternatively, a software program of lighting states for a lighting performance may be edited external to the system 100 and received by the controller 200 via the communications interface 260. In some embodiments, a software program of lighting states is saved in the memory 225, database 150, or the network 155 for play back at a later time. In some embodiments, the software program of lighting states includes the internal or external conditions for advancing to a next lighting state. The GUI 600 also allows a user to make next state selections, real-time, during a lighting performance. In some embodiments, the real-time user selections override play back of a software lighting performance program or may be performed by the user via the GUI 600 without running a software program (e.g., as in busking).

Referring to FIG. 6B, a GUI 680 illustrates another GUI style that may be used for implementing lighting control based on a lighting graph and which provides the same functionality as the GUI 600. Rather than using a tree-like presentation as in the GUI 600, the GUI 680 provides an interactive table that allows for transitioning from an originating or current lighting state to a plurality of conditionally or unconditionally available next lighting states. For example, the table may indicate lighting states that are available for selection by a user from a current state (e.g., by an X) and states that are not available for selection (e.g. by a blank cell) in the table. Also, by selecting a lighting state via GUI elements of the first column in table 685, the controller 200 may display information about the selected lighting state and/or provide an interactive GUI element for editing the selected lighting state (as described above with respect to FIG. 6A). Furthermore, a lighting performance software program may be edited using the lighting states listed in the first column, or real-time next-state selections may be received via GUI elements of the first column during a lighting performance. Transitions between states and conditions for change from a one state to another state are also selectable via the GUI. Similar to the GUI 600, the next lighting states, transitions, and/or conditions that are displayed as available for selection in an interactive table 685, are filtered from all of the possible next states, transitions, and/or conditions, relative to a lighting graph, based on the internal or external conditions of the system 100.

In some embodiments, an input signal to the processing unit 220 for triggering execution of a lighting operation or changing of a lighting state (e.g., transmitting drive signals to light fixtures) is generated by a software instruction executed by the processing unit 220. In other embodiments, the input signal for triggering the execution of the lighting operation or changing of the lighting state is generated as a result of user input via the GUI 600, 680 at the user interface 210, or the control board 125. In some embodiments, the input signal to the processing unit 220 that triggers execution of a lighting operation or a lighting state is generated as a result of a sensor 215 output, for example, in response to a specified drum rhythm or spoken words in a performance.

Figure 7:
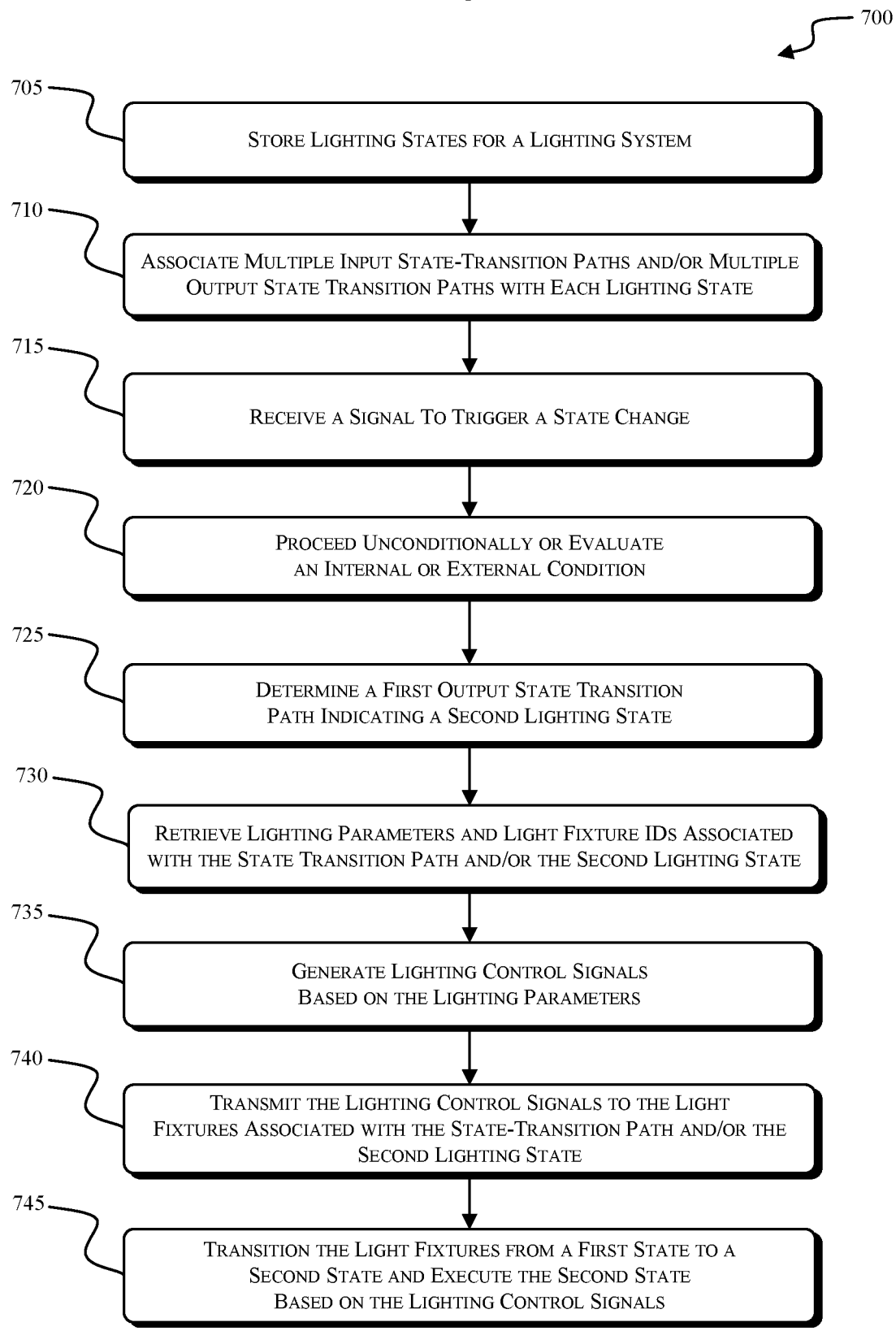
FIG. 7 illustrates a process for controlling a lighting system based on a lighting graph, according to some embodiments.

FIG. 7 is a process 700 for controlling a lighting system based on a lighting graph. For example, the process 700 may control execution or play back of a first lighting state (e.g., a current lighting state) and determining and/or executing a transition to a second lighting state (e.g., a next lighting state). In step 705, lighting states (e.g., at least three lighting states) are stored in the memory 225 (and/or a memory of the database 150). The lighting states include light fixture information and lighting parameters for controlling the light fixtures (e.g., the light fixtures 130-145). A user may edit the lighting states via the GUI 600, 680 or the controller 200 may receive the lighting states via the communications interface 260. In some embodiments, a lighting state also specifies a condition or criteria to be met before allowing selection of the lighting state from a GUI or play back of the lighting state by the lighting system 100.

In step 710, multiple input lighting state transition paths and/or multiple output state transition paths are associated in the memory with each lighting state (e.g., stored in memory 225, and/or the database 150). An output lighting state transition path association specifies a candidate next lighting state that may be transitioned to (conditionally or unconditionally) from a particular (or current) lighting state. An input lighting state transition path specifies a lighting state that may transition to the particular lighting state.

In step 715, the controller 200 receives an input signal for triggering a change in state. In some embodiments, the input signal is related to a condition internal to the lighting system 100 or an external condition. The input signal may include a trigger for a lighting state transition based on a lighting graph (including multiple possible output state transition paths). The input signal may be generated as a result of user input (via the GUI 600, 680, or the light control board 125), execution of a software program, and/or detection of an event or condition by the controller 200 (e.g., via a sensor 215).

In step 720, the processing unit 220 either proceeds unconditionally or evaluates one or more internal or external conditions related to one or more transition paths. The internal or external conditions may include, for example, a status of one or more light fixtures 130-145 or equipment in the lighting system 100 (see FIG. 3), status of communication systems or interfaces in the lighting system 100, and/or output of a sensor 215 (e.g., indicating ambient light, wind speed, audible event, a user input via the user interface 210 or control board 125, or a detected audible or visual event occurring on a stage or within a physical environment associated with the lighting system 100).

In step 725, the controller 200 determines or selects a first output state transition path based on the input signal unconditionally or based on the input signal and the result of evaluation of an internal or external condition. The first output state transition path indicates a second lighting state (e.g., a next lighting state) that may be executed or played back after the first lighting state (e.g., a current lighting state). The state transition path may be associated with one or more parameters that define light fixture behavior between the first lighting state and a second lighting state. In step 730, the controller 200 retrieves from the memory 225 one or more lighting parameters and one or more light fixture identifiers associated with, or included in, the state transition path and/or the second lighting state.

In step 735, the controller 200 generates control signals based on the one or more lighting parameters for the identified one or more light fixtures. In step 740, the controller 200 transmits the lighting control signals (e.g., via the control board 125) to the identified one or more light fixtures associated with the state transition path and/or the second lighting state. In step 745, the one or more identified light fixtures receive the lighting control signals from the controller 200 and execute the transition from the first state to the second state based on transition light control signals, and execute the second state based on the second state lighting control signals.

For example, a first (or current) lighting state is a lighting state D. A second lighting state may identify lights in the back truss 310 including the light fixtures 130-145. The lighting parameters of the second state may indicate that all of the light fixtures 130-145 dim to zero intensity over 15 seconds. A condition for playing back the second lighting state specifies that play back of any of lighting states A, B, C, D, E, or F must be complete before playing back the second lighting state. The controller 200 receives an input signal triggered by a lighting performance software program to play back the second lighting state where the current lighting state is state D (as noted above). The controller 200 evaluates the condition of the second lighting state and determines that play back of state D is complete. The controller then generates light fixture drive signals based on the lighting parameters to dim the light fixtures to zero intensity over 15 seconds, and transmit the drive signals to the light fixtures 130-145. The light fixtures 130-145 are then controlled to dim to zero intensity.

In another example, a first (or current) lighting state is associated with conditions for exiting the first lighting state and transitioning to a second lighting state. The conditions include a first condition for transitioning to state A, a second condition for transitioning to state B, a third condition for transitioning to state C, a fourth condition for transitioning to state D, a fifth condition for transitioning to state E, and a sixth condition for transitioning to state F. During play back of the first lighting state, the controller 200 receives an input signal to transition to another lighting state. The controller tests or evaluates each of the conditions associated with exiting the first lighting state and determines a transition path to a second lighting state based on results of the test. The controller retrieves parameters for the determined transition path (e.g., timing and/or color conversion parameters to reach the second lighting state). The controller then generates light fixture drive signals based on the transition lighting parameters to arrive at the second lighting state and transmits the transition drive signals to the light fixtures 130-145 for execution. The controller 200 retrieves lighting parameters associated with the second lighting state and generates light fixture drive signals based on the second lighting state parameters for execution of the second lighting state, and transmits the second lighting state drive signals to light fixtures 130-145 for execution.

In another example, a first (or current) lighting state is associated with a first exit transition that is unconditional and a second exit transition that is conditional. The controller 200 receives a signal to transition to a next state and evaluates a condition associated with the second exit transition. When results of the evaluation indicate that the condition is met, the controller 200 executes the second exit transition based on light system parameters associated with the second exit transition (e.g., color conversion parameters, timing parameters, intensity parameters, etc.). In instances when the results of the evaluation indicate that the condition is not met, the controller 200 executes the unconditional first exit transition based on lighting system parameters associated with the first exit transition. In some embodiments, the controller 200 receives a user input that overrides one or both of the first exit transition and the second exit transition, and a default exit transition is executed based on default lighting system parameters.

Thus, embodiments described herein provide, among other things, systems, methods, and devices for controlling the outputs of one or more light fixtures. Various features and advantages are set forth in the following claims.

What is claimed is:

1. A system for controlling transitions in a lighting system based on a lighting graph, the system comprising:
    a light fixture; and
    a controller electrically connected to the light fixture, the controller includes an electronic processor and a memory coupled to the electronic processor, the memory storing instructions that when executed by the electronic processor configure the controller to:
        store, in the memory, three or more lighting states, wherein each of the three or more lighting states is associated with a respective lighting parameter for controlling the light fixture,
        associate, in memory, multiple input state transition paths with each of the three or more lighting states, wherein the multiple input state transition paths identify candidate prior states relative to the three or more lighting states,
        associate, in memory, multiple output state transition paths with each of the three or more lighting states, wherein the multiple output state transition paths identify candidate next states relative to the three or more lighting states,
        determine a first output state transition path of the multiple output state transition paths associated with a first lighting state of the three or more lighting states, wherein the first output state transition path indicates a second lighting state of the three or more lighting states, and
        transmit a light control signal to the light fixture based on the respective lighting parameter associated with the second lighting state of the three or more lighting states.

2. The system of claim 1, wherein the respective lighting parameters for controlling the light fixture of the three or more lighting states define an entire lighting state or define a difference relative to a prior-played lighting state.

3. The system of claim 1, further comprising one or more additional light fixtures electrically connected to the controller, wherein:
    each of the three or more lighting states is associated with a respective one or more lighting parameters for controlling the one or more additional light fixtures; and
    the controller is further configured to transmit a light control signal to the one or more additional light fixtures based on the respective one or more lighting parameters associated with the second lighting state of the three or more lighting states.

4. The system of claim 1, wherein the controller is further configured to:
    receive an input signal related to a condition internal or external to the lighting system; and
    evaluate the condition and generate a first condition evaluation result, wherein the first output state transition path of the multiple output state transition paths associated with a first lighting state of the three or more lighting states, is determined based on the first condition evaluation result.

5. The system of claim 4, further including a sensor, wherein the controller detects an output from the sensor and the condition is based on the output from the sensor.

6. The system of claim 4, wherein the condition is based on information known by the system, information stored in the memory, or a user input received by the controller via a user interface of the system.

7. The system of claim 4, wherein the input signal is generated based on:
    a program executed by the electronic processor;
    a user input received by the controller via a user interface of the system; or
    a condition detected by the controller.

8. The system of claim 4, wherein in response to a second evaluation result, the controller is configured to:
    select a default output state transition path that identifies a third lighting state of the three or more lighting states; and
    transmit a light control signal to the light fixture based on a respective lighting parameter associated with the third lighting state of the three or more lighting states.

9. The system of claim 4, further comprising a display device, wherein the controller is further configured to:
    generate an interactive user interface including user selectable elements that enable a user to select the output state transition path for the first lighting state of the three or more lighting states, wherein the user selectable elements for the user selection of the output state transition path are rendered active or in-active in the user interface based on the condition internal or external to the lighting system;
    detect a user selection of the output state transition path for the first lighting state of the three or more lighting states, the user selection received via an active selectable element of the interactive user interface; and generate the input signal related to the condition internal or external to the lighting system based on the user selection.

10. The system of claim 4, wherein:

the condition internal to the lighting system includes a level of a fader, a light fixture intensity, a light fixture color output, configurations of light fixture locations, fog machine control, or a number of light fixtures available for control; and the conditions external to the lighting system include wind speed or wind direction, ambient light level, or a sound level, pitch, or cadence, wherein the conditions external to the lighting system are detected via a sensor connected to the controller.

11. A method for controlling transitions in a lighting system based on a lighting graph, the method comprising:

storing in a memory, by an electronic processor, three or more lighting states, wherein each of the three or more lighting states is associated with a respective lighting parameter for controlling a light fixture of the lighting system;

associating in the memory, by the electronic processor, multiple input state transition paths with each of the three or more lighting states, wherein the multiple input state transition paths identify candidate prior states relative to the three or more lighting states;

associating in the memory, by the electronic processor, multiple output state transition paths with each of the three or more lighting states, wherein the multiple output state transition paths identify candidate next states relative to the three or more lighting states;

determining, by the electronic processor, a first output state transition path of the multiple output state transition paths associated with a first lighting state of the three or more lighting states, wherein the first output state transition path indicates a second lighting state of the three or more lighting states; and transmitting, by the electronic processor, a light control signal to the light fixture based on the respective lighting parameter associated with the second lighting state of the three or more lighting states.

12. The method of claim 11, wherein the respective lighting parameters for controlling the light fixture of the three or more lighting states define an entire lighting state or define a difference relative to a prior-played lighting state.

13. The method of claim 11, further comprising:

associating in the memory, by the electronic processor, each of the three or more lighting states is with a respective one or more lighting parameters for controlling one or more additional light fixtures; and transmitting, by the electronic processor, a light control signal to the one or more additional light fixtures based on the respective one or more lighting parameters associated with the second lighting state of the three or more lighting states.

14. The method of claim 11, further comprising:

receiving, by the electronic processor, an input signal related to a condition internal or external to the lighting system; and evaluating, by the electronic processor, the condition and generating a first condition evaluation result, wherein the first output state transition path of the multiple output state transition paths associated with a first lighting state of the three or more lighting states, is determined based on the first condition evaluation result.

15. The method of claim 14, further comprising detecting, by the electronic processor, an output from a sensor, wherein the condition is based on the output from the sensor.

16. The method of claim 14, wherein the condition is based on information known by the lighting system, information stored in the memory, or a user input received by the electronic processor via a user interface of the lighting system.

17. The method of claim 14, wherein the input signal is generated based on:

a program executed by the electronic processor;

a user input received by the electronic processor; or a condition detected by the electronic processor.

18. The method of claim 14, further comprising, in response to a second evaluation result:

selecting, by the electronic processor, a default output state transition path that identifies a third lighting state of the three or more lighting states; and transmitting, by the electronic processor, a light control signal to the light fixture based on a respective lighting parameter associated with the third lighting state of the three or more lighting states.

19. The method of claim 14, further comprising:

generating, by the electronic processor, for display on a display device, an interactive user interface including user selectable elements that enable a user to select the output state transition path for the first lighting state of the three or more lighting states, wherein the user selectable elements for the user selection of the output state transition path are rendered active or in-active in the user interface based on the condition internal or external to the lighting system;

detecting, by the electronic processor, a user selection of the output state transition path for the first lighting state of the three or more lighting states, the user selection received via an active selectable element of the graphical user interface; and generating, by the electronic processor, the input signal related to the condition internal or external to the lighting system based on the user selection.

20. The method of claim 14, wherein:

the condition internal to the lighting system includes a level of a fader, a light fixture intensity, a light fixture color output, configurations of light fixture locations, fog machine control, or a number of light fixtures available for control; and the conditions external to the lighting system include wind speed or wind direction, ambient light level, or a sound level, pitch, or cadence, wherein the conditions external to the lighting system are detected via a sensor connected to the controller.

21. A computer readable medium storing a program for controlling transitions in a lighting system based on a lighting graph, the program executable by an electronic processor, wherein the program configures a controller to:

store, in a memory, three or more lighting states, wherein each of the three or more lighting states is associated with a respective lighting parameter for controlling a light fixture of the lighting system;

associate, in the memory, multiple input state transition paths with each of the three or more lighting states, wherein the multiple input state transition paths identify candidate prior states relative to the three or more lighting states;

associate, in the memory, multiple output state transition paths with each of the three or more lighting states, wherein the multiple output state transition paths identify candidate next states relative to the three or more lighting states;

determine a first output state transition path of the multiple output state transition paths associated with a first lighting state of the three or more lighting states, wherein the first output state transition path indicates a second lighting state of the three or more lighting states; and transmit a light control signal to the light fixture based on the respective lighting parameter associated with the second lighting state of the three or more lighting states.

22. The computer readable medium of claim 21, wherein the respective lighting parameters for controlling the light fixture of the three or more lighting states define an entire lighting state or define a difference relative to a prior-played lighting state.

23. The computer readable medium of claim 21, wherein the program configures a controller to:

receive an input signal related to a condition internal or external to the lighting system; and evaluate the condition and generate a first condition evaluation result, wherein the first output state transition path of the multiple output state transition paths associated with a first lighting state of the three or more lighting states, is determined based on the first condition evaluation result.

24. The computer readable medium of claim 23, wherein the input signal is generated based on:

a program executed by the electronic processor;

a user input received by the electronic processor via a user interface; or a condition detected by the electronic processor.

25. The computer readable medium of claim 23, wherein the program further configures the controller to:

generate, for display on a display device, an interactive user interface including user selectable elements that enable a user to select the output state transition path for the first lighting state of the three or more lighting states;

wherein the user selectable elements of the interactive user interface for the user selection of the output state transition path are rendered active or in-active in the user interface based on a condition detected by the electronic processor;

detect a user selection of the output state transition path for the first lighting state of the three or more lighting states, the user selection received via an active selectable element of the graphical user interface; and generate the input signal related to the condition internal or external to the lighting system based on the user selection.

26. The computer readable medium of claim 23, wherein:

the condition internal to the lighting system includes a level of a fader, a light fixture intensity, a light fixture color output, configurations of light fixture locations, fog machine control, or a number of light fixtures available for control; and the conditions external to the lighting system include wind speed or wind direction, ambient light level, or a sound level, pitch, or cadence, wherein the conditions external to the lighting system are detected via a sensor connected to the controller.

* * * * *